United States Patent
Gunderson

(10) Patent No.: US 10,837,635 B2
(45) Date of Patent: Nov. 17, 2020

(54) FUEL SWIRLER WITH ANTI-ROTATION FEATURES

(71) Applicant: UNITED TECHNOLOGIES CORPORATION, Farmington, CT (US)

(72) Inventor: Peter E. Gunderson, West Hartford, CT (US)

(73) Assignee: Raytheon Technologies Corporation, Farmington, CT (US)

(*) Notice: Subject to any disclaimer, the term of this patent is extended or adjusted under 35 U.S.C. 154(b) by 8 days.

(21) Appl. No.: 16/247,264

(22) Filed: Jan. 14, 2019

(65) Prior Publication Data

US 2019/0145619 A1 May 16, 2019

Related U.S. Application Data

(62) Division of application No. 15/495,043, filed on Apr. 24, 2017, now Pat. No. 10,253,976.

(51) Int. Cl.
*F23D 11/38* (2006.01)
*F23R 3/28* (2006.01)
(Continued)

(52) U.S. Cl.
CPC .......... *F23D 11/383* (2013.01); *F23D 11/105* (2013.01); *F23D 11/107* (2013.01); *F23D 14/24* (2013.01); *F23R 3/002* (2013.01); *F23R 3/06* (2013.01); *F23R 3/12* (2013.01); *F23R 3/14* (2013.01); *F23R 3/26* (2013.01); *F23R 3/28* (2013.01); *F23R 3/283* (2013.01); *F23R 3/286* (2013.01); *F23R 3/60* (2013.01);
(Continued)

(58) Field of Classification Search
CPC .... F23D 11/103; F23D 11/105; F23D 11/107; F23D 11/383; F23D 14/24; F23D 2900/14021; F23D 2900/14241; F23D 2900/14701; F23R 3/12; F23R 3/14; F23R 3/283; F23R 3/286; F23R 2900/00017
See application file for complete search history.

(56) References Cited

U.S. PATENT DOCUMENTS 4,870,818 A   10/1989   Suliga
5,916,142 A   6/1999   Snyder et al.
(Continued)

FOREIGN PATENT DOCUMENTS

EP   1710503   10/2006
WO   2014043537   3/2014
(Continued)

OTHER PUBLICATIONS

European Patent Office: European Search Report dated Jul. 25, 2018 in Application No. 18168266.7.
(Continued)

*Primary Examiner* — Scott J Walthour
(74) *Attorney, Agent, or Firm* — Snell & Wilmer L.L.P.

(57) ABSTRACT

A fuel swirler with anti-rotation features is provided. A swirler assembly may comprise a swirler, a guide plate, and a retaining ring. The swirler, the guide plate, and/or the retaining ring may comprise recessions configured to receive a retaining element. The retaining element may be configured to interface with the recessions to create an interference in the swirler assembly. The interference may at least partially resist rotation of the guide plate with respect to the swirler.

10 Claims, 7 Drawing Sheets

(51) Int. Cl.

| | |
|---|---|
| *F23R 3/14* | (2006.01) |
| *F23D 11/10* | (2006.01) |
| *F23D 14/24* | (2006.01) |
| *F23R 3/60* | (2006.01) |
| *F23R 3/00* | (2006.01) |
| *F23R 3/06* | (2006.01) |
| *F23R 3/12* | (2006.01) |
| *F23R 3/26* | (2006.01) |

(52) U.S. Cl.
CPC ...... *F05D 2230/64* (2013.01); *F05D 2240/35* (2013.01); *F05D 2260/30* (2013.01); *F23D 2900/14021* (2013.01); *F23D 2900/14241* (2013.01); *F23R 2900/00012* (2013.01); *F23R 2900/00017* (2013.01); *Y02T 50/675* (2013.01)

(56) References Cited

U.S. PATENT DOCUMENTS

| | | |
|---|---|---|
| 6,427,435 B1 | 8/2002 | Patterson et al. |
| 8,689,563 B2 | 4/2014 | Low |
| 2006/0130483 A1 | 6/2006 | Howell et al. |
| 2006/0207258 A1 | 9/2006 | Tanner et al. |
| 2007/0033950 A1 | 2/2007 | Bernier et al. |
| 2010/0199674 A1 | 8/2010 | Widener et al. |
| 2011/0000216 A1 | 1/2011 | Imamura et al. |
| 2011/0005231 A1 | 1/2011 | Low |
| 2015/0192300 A1 | 7/2015 | Max et al. |
| 2016/0223193 A1 | 8/2016 | Eastwood et al. |

FOREIGN PATENT DOCUMENTS

| | | |
|---|---|---|
| WO | 2014100667 | 6/2014 |
| WO | 2015061068 | 4/2015 |

OTHER PUBLICATIONS

USPTO, Pre-Interview First Office Action Issued in U.S. Appl. No. 15/495,043 dated May 30, 2018.

USPTO, First Action Interview Office Action Issued in U.S. Appl. No. 15/495,043 dated Jul. 19, 2018.

USPTO, Requirement for Restriction / Election Issued in U.S. Appl. No. 15/495,043 dated Dec. 22, 2017.

USPTO, Notice of Allowance filed in U.S. Appl. No. 15/495,043 dated Dec. 3, 2018.

EPO: European Search Report dated Jul. 25, 2018 in Application No. 18168266.7.

FUEL SWIRLER WITH ANTI-ROTATION FEATURES

CROSS-REFERENCE

The This application is a divisional of, and claims priority to, U.S. application Ser. No. 15/495,043, filed Apr. 24, 2017 and entitled "FUEL SWIRLER WITH ANTI-ROTATION FEATURES," and which is hereby incorporated by reference in its entirety.

FIELD

The present disclosure relates generally to gas turbine engines, and more specifically, to a fuel swirler for gas turbine engines.

BACKGROUND

Gas turbine engines typically include a fan section, a compressor section, a combustor section and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

SUMMARY

In various embodiments, a swirler assembly is disclosed. The swirler assembly may comprise a swirler comprising a guide plate recession defining a recess on a forward swirler surface. The swirler assembly may comprise a guide plate coupled within the guide plate recession of the swirler. The swirler assembly may comprise a retaining ring coupled to the guide plate. The swirler assembly may comprise a retaining element configured to interface with the retaining ring, the guide plate, and the swirler, wherein the retaining element is configured to create an interference in the swirler assembly that at least partially resists rotation of the guide plate with respect to the swirler.

In various embodiments, the retaining element may be located on an aft retaining surface of the retaining ring, wherein the guide plate comprises a guide retaining recession defining an axial void on a forward guide surface of the guide plate, the swirler comprises a swirler retaining recession defining an axial void on the forward swirler surface, and wherein the retaining element is configured to interface with the guide retaining recession and the swirler retaining recession. In various embodiments, the retaining element may be located on the forward swirler surface of the swirler, wherein the guide plate comprises a guide retaining recession defining an axial void on a forward guide surface of the guide plate, the retaining ring comprises a retaining recession defining an axial void on a forward retaining surface of the retaining ring, and wherein the retaining element is configured to interface with the guide retaining recession and the retaining recession. In various embodiments, the retaining element may be located on at least one of a forward guide surface or an aft guide surface of the guide plate, wherein the retaining ring comprises a retaining recession defining an axial void on a forward retaining surface of the retaining ring, the swirler comprises a swirler retaining recession defining an axial void on the forward swirler surface, and wherein the retaining element is configured to interface with at least one of the retaining recession or the swirler retaining recession. In various embodiments, at least one of the guide plate, the retaining ring, or the swirler may be formed using investment casting. The retaining element may comprise an angular shape, a circular shape, or a pin shape. The guide plate may comprise an aft sealing protrusion extending in an axial direction from an aft guide surface of the guide plate, wherein the aft sealing protrusion is configured to provide radial sealing against a radially inner swirler surface of the swirler in response to the guide plate being coupled to the swirler. The guide plate may comprise a forward sealing protrusion extending in an axial direction from a forward guide surface of the guide plate, wherein the forward sealing protrusion is configured to provide radial sealing against a radially inner surface of the retaining ring in response to the guide plate being coupled to the retaining ring.

In various embodiments, a gas turbine engine is disclosed. The gas turbine engine may comprise a combustor, a fuel nozzle configured to deliver fuel into the combustor, and a swirler assembly coupled around a distal end of the fuel Nozzle. The swirler assembly may comprise a swirler comprising a guide plate recession defining a recess on a forward swirler surface; a guide plate coupled within the guide plate recession of the swirler; a retaining ring coupled to the guide plate; and a retaining element configured to interface with the retaining ring, the guide plate, and the swirler, wherein the retaining element is configured to create an interference in the swirler assembly that at least partially resists rotation of the guide plate with respect to the swirler.

In various embodiments, the retaining element may be located on an aft retaining surface of the retaining ring, wherein the guide plate comprises a guide retaining recession defining an axial void on a forward guide surface of the guide plate, the swirler comprises a swirler retaining recession defining an axial void on the forward swirler surface, and wherein the retaining element is configured to interface with the guide retaining recession and the swirler retaining recession. In various embodiments, the retaining element may be located on the forward swirler surface of the swirler, wherein the guide plate comprises a guide retaining recession defining an axial void on a forward guide surface of the guide plate, the retaining ring comprises a retaining recession defining an axial void on a forward retaining surface of the retaining ring, and wherein the retaining element is configured to interface with the guide retaining recession and the retaining recession. In various embodiments, the retaining element may be located on at least one of a forward guide surface or an aft guide surface of the guide plate, wherein the retaining ring comprises a retaining recession defining an axial void on a forward retaining surface of the retaining ring, the swirler comprises a swirler retaining recession defining an axial void on the forward swirler surface, and wherein the retaining element is configured to interface with at least one of the retaining recession or the swirler retaining recession. In various embodiments, at least one of the guide plate, the retaining ring, or the swirler may be formed using investment casting. The retaining element may comprise an angular shape, a circular shape, or a pin shape. The guide plate may comprise an aft sealing protrusion extending in an axial direction from an aft guide surface of the guide plate, wherein the aft sealing protrusion is configured to provide radial sealing against a radially inner swirler surface of the swirler in response to the guide plate being coupled to the swirler. The guide plate may comprise a forward sealing protrusion extending in an axial direction from a forward guide surface of the guide plate, wherein the forward sealing protrusion is configured to provide radial sealing against a radially inner surface of the retaining ring in response to the guide plate being coupled to the retaining ring In various embodiments, a swirler assembly is disclosed. The swirler assembly may comprise a swirler having a forward swirler surface axially opposite an aft swirler surface, wherein the swirler comprises a guide plate recession defining a recess on the forward swirler surface and a swirler retaining recession defining a void through the forward swirler surface; a guide plate having a forward guide surface axially opposite an aft guide surface, wherein the guide plate is coupled within the guide plate recession of the swirler, and wherein the guide plate comprises a guide retaining recession defining a void through the forward guide surface; and a retaining ring having a forward retaining surface axially opposite an aft retaining surface, wherein the retaining ring is coupled to the guide plate, and wherein the retaining ring comprises a retaining element extending in an axial direction from the aft retaining surface, wherein the retaining element is configured to at least partially insert into the guide retaining recession and the swirler retaining recession in response to the retaining ring, the guide plate, and the swirler being coupled together to create an interference in the swirler assembly that at least partially resists rotation of the guide plate with respect to the swirler.

In various embodiments, at least one of the guide plate, the retaining ring, or the swirler may be formed using investment casting. The guide plate may comprise an aft sealing protrusion extending in an axial direction from the aft guide surface, wherein the aft sealing protrusion is configured to provide radial sealing against a radially inner swirler surface of the swirler in response to the guide plate being coupled to the swirler. The guide plate may comprise a forward sealing protrusion extending in an axial direction from the forward guide surface, wherein the forward sealing protrusion is configured to provide radial sealing against a radially inner surface of the retaining ring in response to the guide plate being coupled to the retaining ring.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
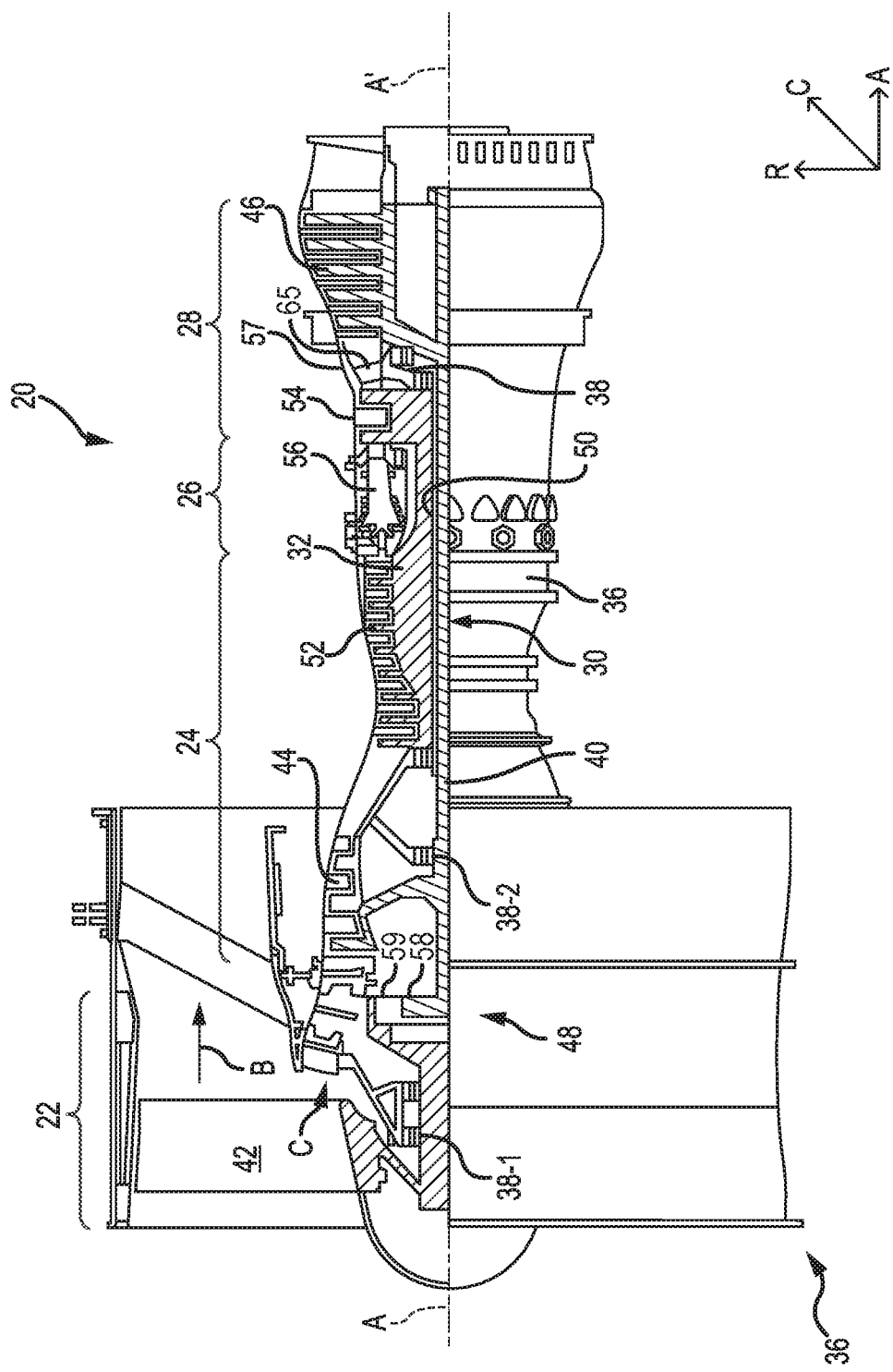
FIG. 1 illustrates a schematic cross-section of an exemplary gas turbine engine, in accordance with various embodiments.

In various embodiments, and with reference to FIG. 1, a gas turbine engine 20 is disclosed. As used herein, "aft" refers to the direction associated with a tail (e.g., the back end) of an aircraft, or generally, to the direction of exhaust of gas turbine engine 20. As used herein, "forward" refers to the direction associated with a nose (e.g., the front end) of the aircraft, or generally, to the direction of flight or motion. An A-R-C axis has been included throughout the figures to illustrate the axial (A), radial (R) and circumferential (C) directions. For clarity, axial axis A spans parallel to engine central longitudinal axis A-A'. As utilized herein, radially inward refers to the negative R direction towards engine central longitudinal axis A-A', and radially outward refers to the R direction away from engine central longitudinal axis A-A'.

Gas turbine engine 20 may comprise a two-spool turbofan that generally incorporates a fan section 22, a compressor section 24, a combustor section 26, and a turbine section 28. Gas turbine engine 20 may also comprise, for example, an augmenter section, and/or any other suitable system, section, or feature. In operation, fan section 22 may drive coolant (e.g., air) along a bypass flow-path B, while compressor section 24 may further drive coolant along a core flow-path C for compression and communication into combustor section 26, before expansion through turbine section 28. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 20 may comprise a low speed spool 30 and a high speed spool 32 mounted for rotation about an engine central longitudinal axis A-A' relative to an engine static structure 36 or an engine case via one or more bearing systems 38 (shown as, for example, bearing system 38-1 and bearing system 38-2 in FIG. 1). It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure (or a first) compressor section 44, and a low pressure (or a second) turbine section 46. Inner shaft 40 may be connected to fan 42 through a geared architecture 48 that can drive fan 42 at a lower speed than low speed spool 30. Geared architecture 48 may comprise a gear assembly 58 enclosed within a gear housing 59. Gear assembly 58 may couple inner shaft 40 to a rotating fan structure. High speed spool 32 may comprise an outer shaft 50 that interconnects a high pressure compressor ("HPC") 52 (e.g., a second compressor section) and high pressure (or a first) turbine section 54. A combustor 56 may be located between HPC 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and may rotate via bearing systems 38 about engine central longitudinal axis A-A'. As used herein, a "high pressure" compressor and/or turbine may experience a higher pressure than a corresponding "low pressure" compressor and/or turbine.

In various embodiments, the coolant along core airflow C may be compressed by low pressure compressor 44 and HPC 52, mixed and burned with fuel in combustor 56, and expanded over high pressure turbine 54 and low pressure turbine 46. Mid-turbine frame 57 may comprise airfoils 65 located in core airflow path C. Low pressure turbine 46 and high pressure turbine 54 may rotationally drive low speed spool 30 and high speed spool 32, respectively, in response to the expansion.

In various embodiments, gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
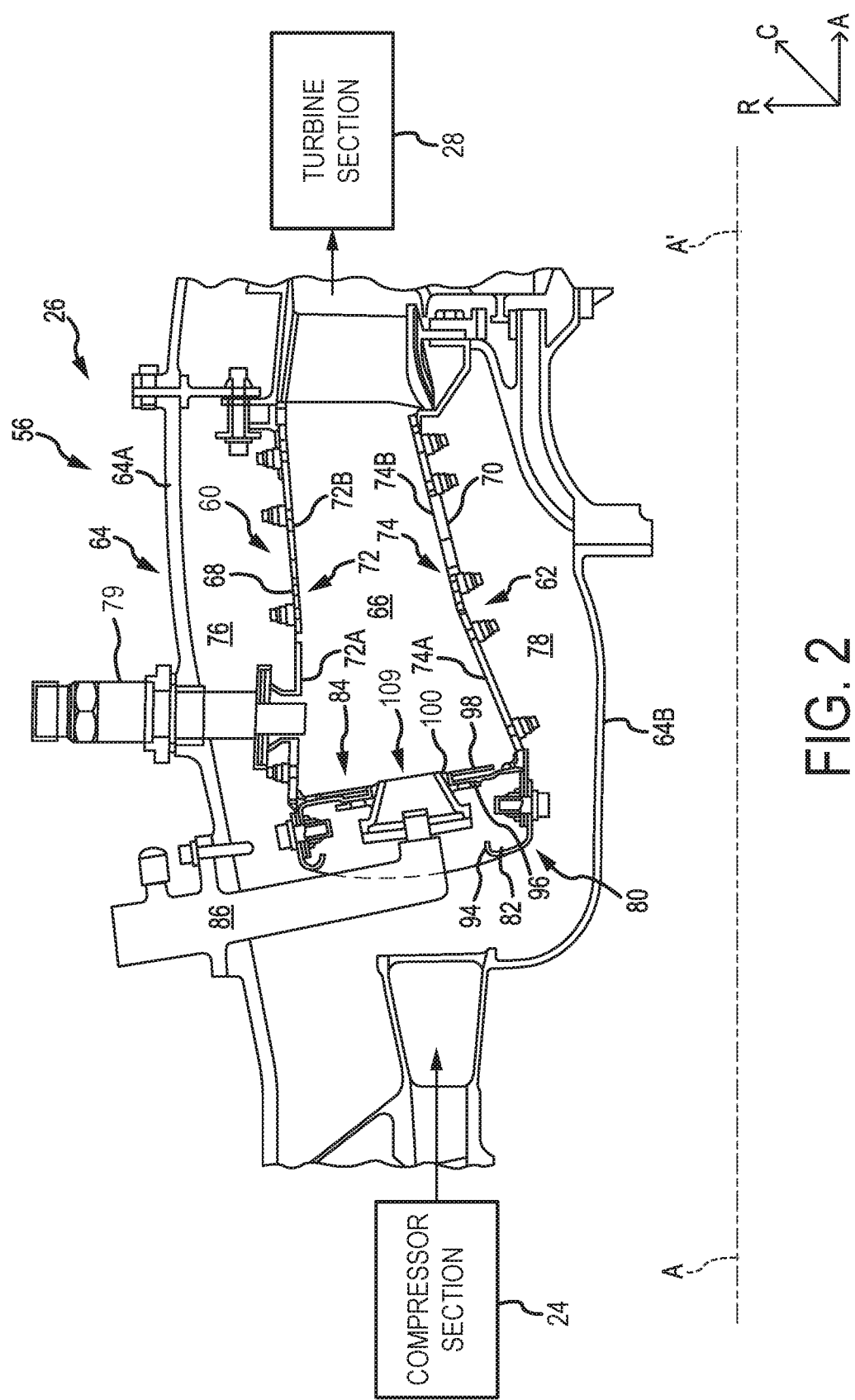
FIG. 2 illustrates a schematic cross-section of a combustor section of an exemplary gas turbine engine, in accordance with various embodiments.

With reference now to FIG. 2 and continued reference to FIG. 1, combustor section 26 generally includes combustor 56 with an outer combustor wall assembly 60, an inner combustor wall assembly 62, and a diffuser case module 64 that encases assemblies 60, 62. Outer combustor wall assembly 60 and inner combustor wall assembly 62 are radially spaced apart such that an annular combustion chamber 66 is defined therebetween.

Outer combustor wall assembly 60 is spaced radially inward from an outer diffuser case 64A of diffuser case module 64 to define an outer annular plenum 76. Inner combustor wall assembly 62 is spaced radially outward from an inner diffuser case 64B of diffuser case module 64 to define an inner annular plenum 78. It should be understood that although a particular combustor is illustrated, other combustor types with various combustor liner arrangements will also benefit from the present disclosure. It should be further understood that the disclosed cooling flow paths are but an illustrated embodiment and should not be limited.

Combustion chamber 66 may contain the combustion products that flow axially toward turbine section 28. Each combustor wall assembly 60, 62 generally includes a respective support shell 68, 70 that supports one or more liners 72, 74 mounted thereto. Each of the liners 72, 74 may be formed of a plurality of floating heat shields or panels that are generally rectilinear and manufactured of, for example, a nickel based super alloy that may be coated with a ceramic, or other temperature resistant material, and are arranged to form a liner array. Each liner may have a plurality of forward panels 72A and a plurality of aft panels 72B that line outer shell 68. A plurality of forward panels 74A and a plurality of aft panels 74B also line inner shell 70. At least one igniter 79 may generally be located at and projects through forward panel 72A to initially ignite a blended fuel-air mixture. It should be appreciated that the liner array may include a single panel rather than the illustrated axial forward and axial aft panels.

Combustor 56 further includes a forward assembly 80 immediately downstream (e.g., aft) of compressor section 24 to receive compressed airflow therefrom. Forward assembly 80 may generally include an annular hood 82, a bulkhead assembly 84, and one or more swirler assemblies 100 (one shown) that are circumferentially spaced from one-another. Each swirler assembly 100 is circumferentially aligned with one of a plurality of fuel nozzles 86 (one shown) and a respective one of a plurality of hood ports 94. Bulkhead assembly 84 includes a bulkhead support shell 96 secured to combustor wall assemblies 60, 62, and a liner that may have a plurality of circumferentially distributed bulkhead heat shields or panels 98 secured to bulkhead support shell 96 around each of a respective swirler assembly opening 109. Bulkhead support shell 96 is generally annular and the plurality of circumferentially distributed bulkhead panels 98 are segmented, typically one to each fuel nozzle 86 and swirler assembly 100.

Annular hood 82 extends radially between, and is secured to, the forward most ends of combustor wall assemblies 60, 62. Each one of the plurality of circumferentially distributed hood ports 94 receives a respective one of the plurality of fuel nozzles 86 and facilitates the direction of compressed air into the forward end of the combustion chamber 66 through swirler assembly opening 109. Each fuel nozzle 86 may be secured to diffuser case module 64 and projects through one of the hood ports 94 into the respective swirler assembly opening 109.

Forward assembly 80 introduces core combustion air into the forward section of combustion chamber 66 while the remainder enters outer annular plenum 76 and inner annular plenum 78. The plurality of fuel nozzles 86, swirler assemblies 100, and adjacent structures generate the blended fuel-air mixture that supports stable combustion in combustion chamber 66.

Figure 3A:
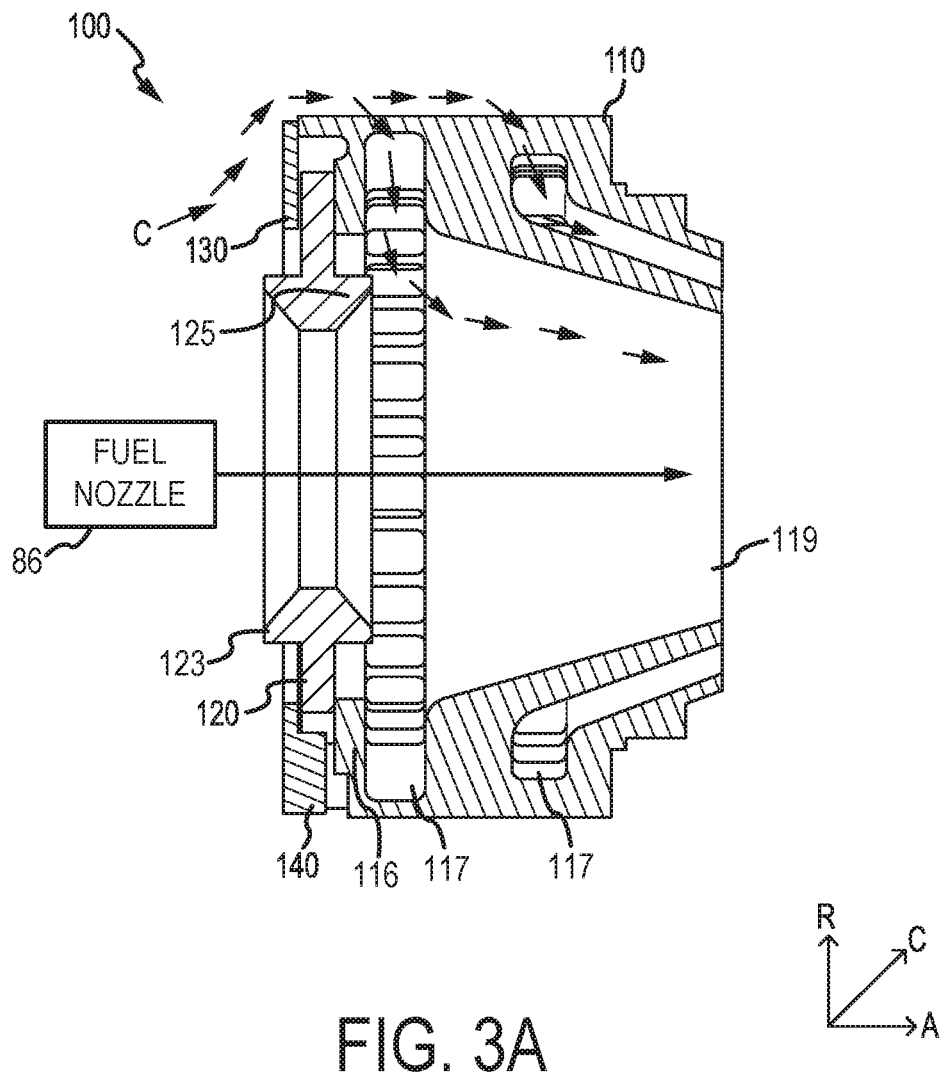
FIG. 3A illustrates a cross-section of a swirler assembly, in accordance with various embodiments.
Figure 3B:
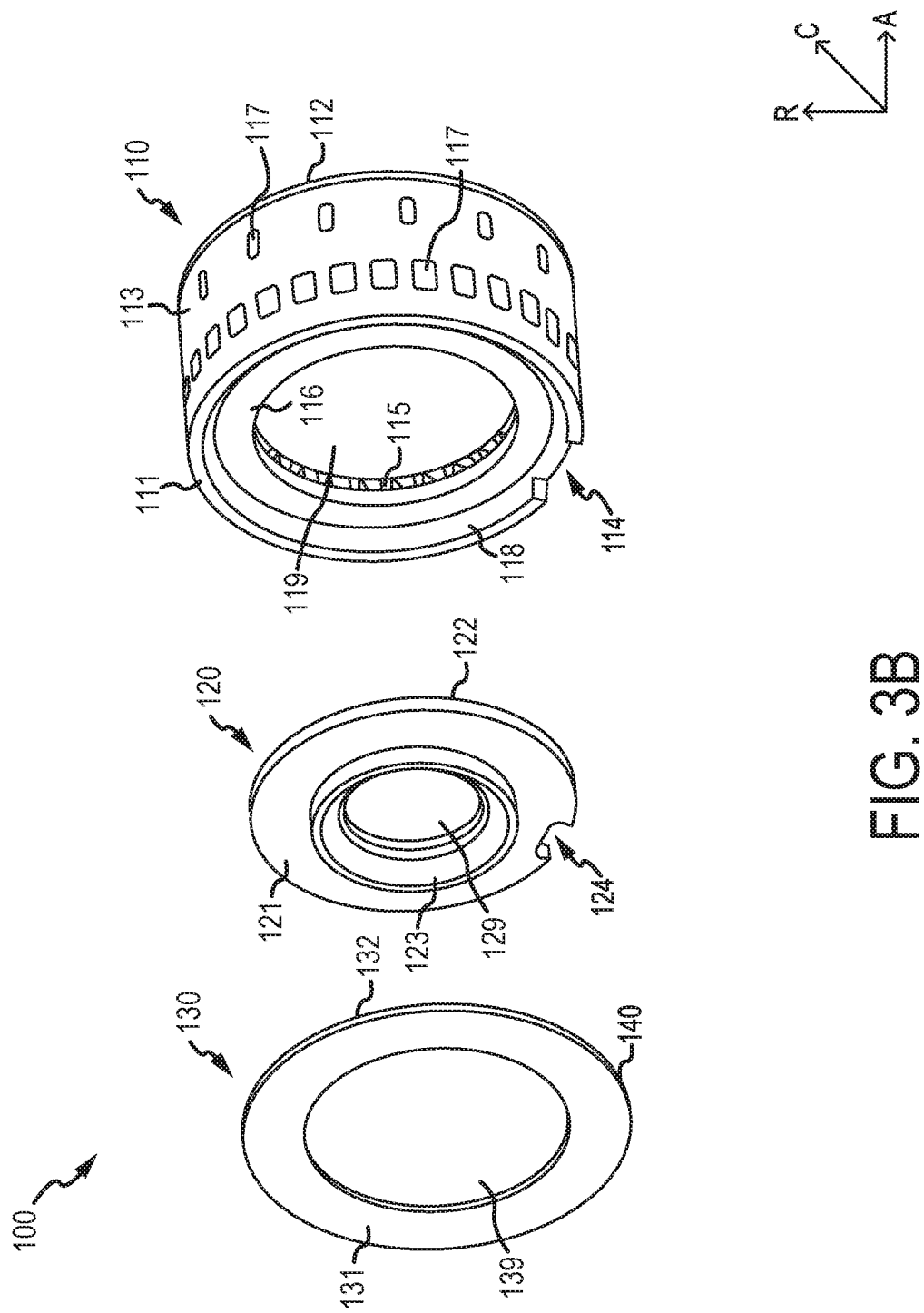
FIG. 3B illustrates a forward perspective view of the swirler assembly, in accordance with various embodiments.
Figure 3C:
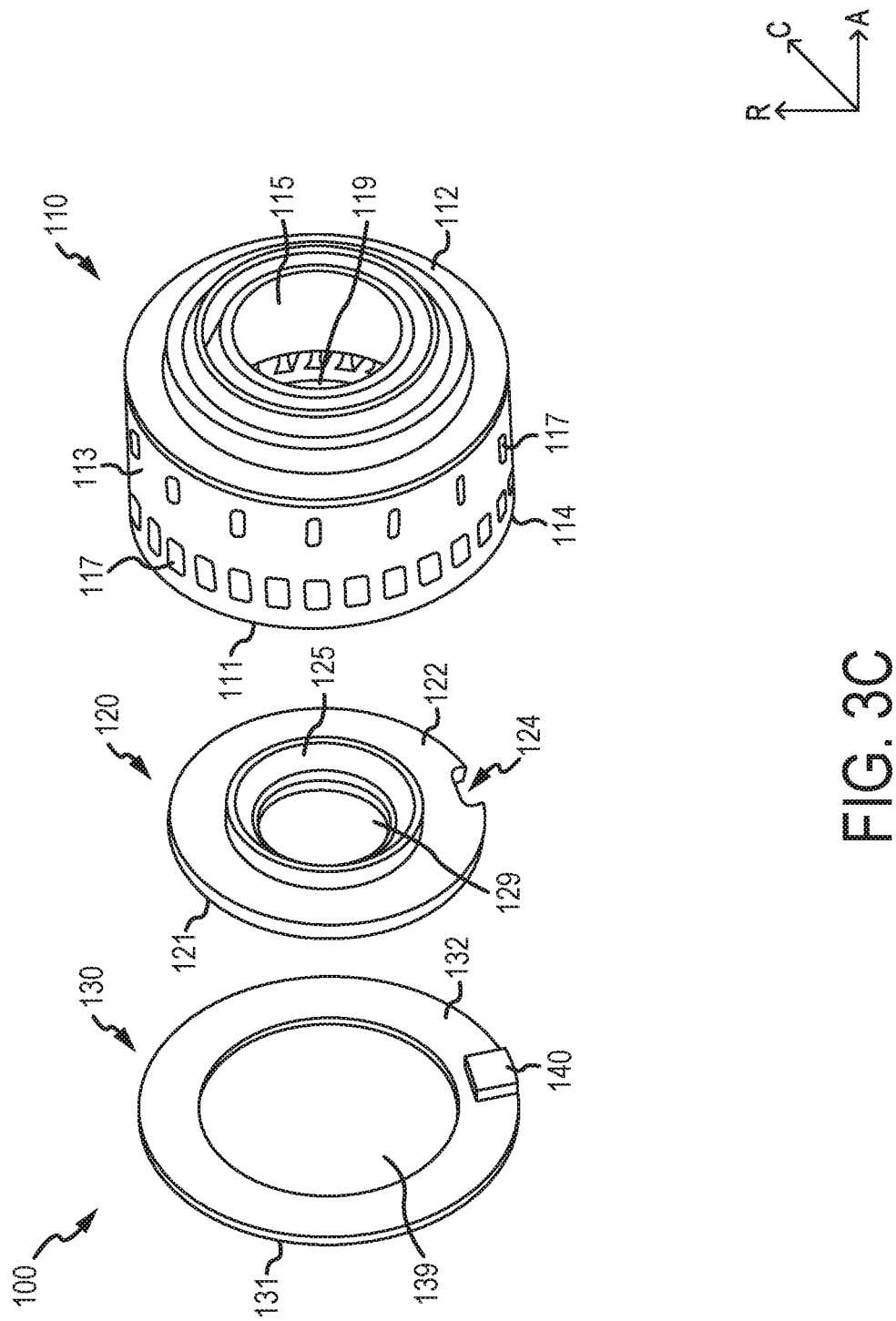
FIG. 3C illustrates an aft perspective view of the swirler assembly, in accordance with various embodiments.

In various embodiments, and with reference to FIGS. 3A-3C, swirler assembly 100 is depicted in greater detail. Swirler assembly 100 may comprise a swirler 110, a guide plate 120, and/or a retaining ring 130. Swirler assembly 100 may be configured to at least partially ensure retention and/or anti-rotation of guide plate 120 in swirler assembly 100, as discussed further herein. At least partially limiting rotation of guide plate 120 in swirler assembly 100 may provide improved air sealing in swirler assembly 100 and may at least partially limit undesirable wear patterns in swirler assembly 100. Each component of swirler assembly 100 (e.g., swirler 110, guide plate 120, and retaining ring 130) may be formed of various materials and by any suitable manufacturing process. For example, the recessions (e.g., swirler retaining recession 114, guide retaining recession 124, etc.) and retaining elements (e.g., retaining element 140) described herein may be formed using investment casting. In that regard, the use of investment casting may provide cost reduction benefits in the formation of components of swirler assembly 100 when compared to machining techniques of the prior art. In various embodiments, each component of swirler assembly 100 may also be subsequently formed via drilling, milling, electronic discharge manufacturing (EDM), micro-machining, additive manufacturing, and/or any other suitable machining technique.

In various embodiments, swirler 110 may be configured to swirl airflow and provide the swirled airflow into combustion chamber 66. Swirler 110 may comprise a radially outer swirler surface 113 radially opposite a radially inner swirler surface 115. Swirler 110 may comprise one or more swirler inlets 117. Each swirler inlet 117 may define a radial void on radially outer swirler surface 113. Swirler inlets 117 may be configured to receive compressed airflow (e.g., from compressor section 24), swirl the airflow, and introduce the airflow through swirler 110, via swirler opening 119, into combustion chamber 66. Swirler 110 may comprise a forward swirler surface 111 axially opposite an aft swirler surface 112. Swirler 110 may also comprise a swirler opening 119. Swirler opening 119 may define an axial void on forward swirler surface 111. Forward swirler surface 111 may be configured to interface with guide plate 120. For example, swirler 110 may comprise a guide plate recession 116 located on forward swirler surface 111. Guide plate recession 116 may define an axial recession on forward swirler surface 111 circumferentially around swirler opening 119 and may be configured to at least partially receive guide plate 120. In that regard, guide plate recession 116 may comprise any suitable size capable of at least partially fitting guide plate 120 (e.g., as depicted in FIG. 3A). For example, guide plate recession 116 may comprise an inner diameter greater than an outer diameter of guide plate 120, such that guide plate 120 may fit within swirler 110. Forward swirler surface 111 may define an annular wall portion 118 circumferentially surrounding guide plate recession 116. Annular wall portion 118 may circumferentially surround guide plate 120 in response to guide plate 120 being inserted into guide plate recession 116.

In various embodiments, swirler 110 may comprise a swirler retaining recession 114. Swirler retaining recession 114 may define a recess on forward swirler surface 111 proximate radially outer swirler surface 113. Swirler retaining recession 114 may be configured to receive a retaining feature (e.g., retaining element 140) to provide anti-rotation capabilities in swirler assembly 100, as discussed further herein.

In various embodiments, guide plate 120 may be configured to at least partially provide sealing between the higher pressure upstream air located radially outward from swirler assembly 100 and the lower pressure downstream air located within swirler assembly 100. In that regard, guide plate 120 may provide sealing to ensure that the compressed air from compressor section 24 is forced into the swirler inlets 117 in swirler 110. Guide plate 120 may comprise a forward guide surface 121 axially opposite an aft guide surface 122. Aft guide surface 122 may be configured to couple to and/or interface with forward swirler surface 111 of swirler 110. In that regard, guide plate 120 may be configured to at least partially fit within swirler 110 (e.g., at least partially fit within guide plate recession 116) in response to guide plate 120 being coupled to swirler 110. Guide plate 120 may also comprise a guide plate opening 129. Guide plate opening 129 may define an axial void on forward guide surface 121. In various embodiments, guide plate opening 129 may substantially align with swirler opening 119 in response to guide plate 120 being coupled to swirler 110.

In various embodiments, guide plate 120 may comprise a forward sealing protrusion 123 axially opposite an aft sealing protrusion 125. Forward sealing protrusion 123 and aft sealing protrusion 125 may be configured to provide sealing in swirler assembly 100. Forward sealing protrusion 123 may be located on forward guide surface 121 and may extend in an axial direction away from forward guide surface 121 of guide plate 120. Forward sealing protrusion 123 may also define a circumferential boundary along guide plate opening 129. Forward sealing protrusion 123 may be configured to provide sealing against an inner surface of retaining ring 130 in response to retaining ring 130 being coupled to guide plate 120, as discussed further herein. For example, an outer diameter of forward sealing protrusion 123 may be less than an inner diameter of retaining ring 130 such that forward sealing protrusion 123 may fit within retaining ring opening 139 of retaining ring 130. Aft sealing protrusion 125 may be located on aft guide surface 122 and may extend in an axial direction away from aft guide surface 122 of guide plate 120. Aft sealing protrusion 125 may also define a circumferential boundary along guide plate opening 129. Aft sealing protrusion 125 may be configured to provide sealing against radially inner swirler surface 115 of swirler 110 in response to guide plate 120 being coupled to swirler 110. For example, an outer diameter of aft sealing protrusion 125 may be less than an inner diameter of swirler 110 such that aft sealing protrusion 125 may fit within swirler opening 119 of swirler 110.

In various embodiments, guide plate 120 may comprise a guide retaining recession 124. Guide retaining recession 124 may define a recess on forward guide surface 121 proximate a radially outer surface. Guide retaining recession 124 may be configured to receive a retaining feature (e.g., retaining element 140) to provide anti-rotation capabilities in swirler assembly 100, as discussed further herein.

In various embodiments, retaining ring 130 may be configured to couple to guide plate 120 and to retain guide plate 120 against swirler 110. Retaining ring 130 may comprise a forward retaining surface 131 axially opposite an aft retaining surface 132. Retaining ring 130 may couple to guide plate 220 at aft retaining surface 132. Retaining ring 130 may comprise a retaining ring opening 139. Retaining ring opening 139 may define an axial void on forward retaining surface 131. In various embodiments, retaining ring opening 139 may substantially align with guide plate opening 129 and/or swirler opening 119 in response to retaining ring 130 being coupled to guide plate 120.

In various embodiments, swirler assembly 100 may comprise a retaining element 140 configured to provide anti-rotation features in swirler assembly 100 and/or to at least partially ensure retention of guide plate 120 in swirler assembly 100. For example, retaining element 140 may be configured to create an interference in the swirler assembly that at least partially resists rotation of guide plate 120 with respect to swirler 110. In that respect, retaining element 140 may be located in any suitable location in swirler assembly 100 capable of at least partially limiting rotation of guide plate 120 in swirler assembly 100. In various embodiments, retaining element 140 may be located on aft retaining surface 132 of retaining ring 130. For example, retaining element 140 may be located on aft retaining surface 132 and may extend in an axial direction towards guide plate 120 and swirler 110. Retaining element 140 may be configured to interface with one or more recessions in swirler assembly 100. For example, retaining element 140 may be configured to interface with guide retaining recession 124 and swirler retaining recession 114 in response to retaining ring 130, guide plate 120, and swirler 110 being coupled together.

Retaining element 140 may comprise any shape and/or size suitable to provide anti-rotation features in swirler assembly 100. Similarly, each retaining recession in swirler assembly 100 (e.g., guide retaining recession 124, swirler retaining recession 114, etc.) may comprise a corresponding shape and/or size suitable to receive retaining element 140. For example, retaining element 140 may comprise any suitable angular shape (e.g., a triangular shape, a rectangular shape, etc.), a circular shape, a pin shape, and/or the like. Retaining element 140 may also comprise a flat outer surface, a curved outer surface, and/or the like.

Figure 4:
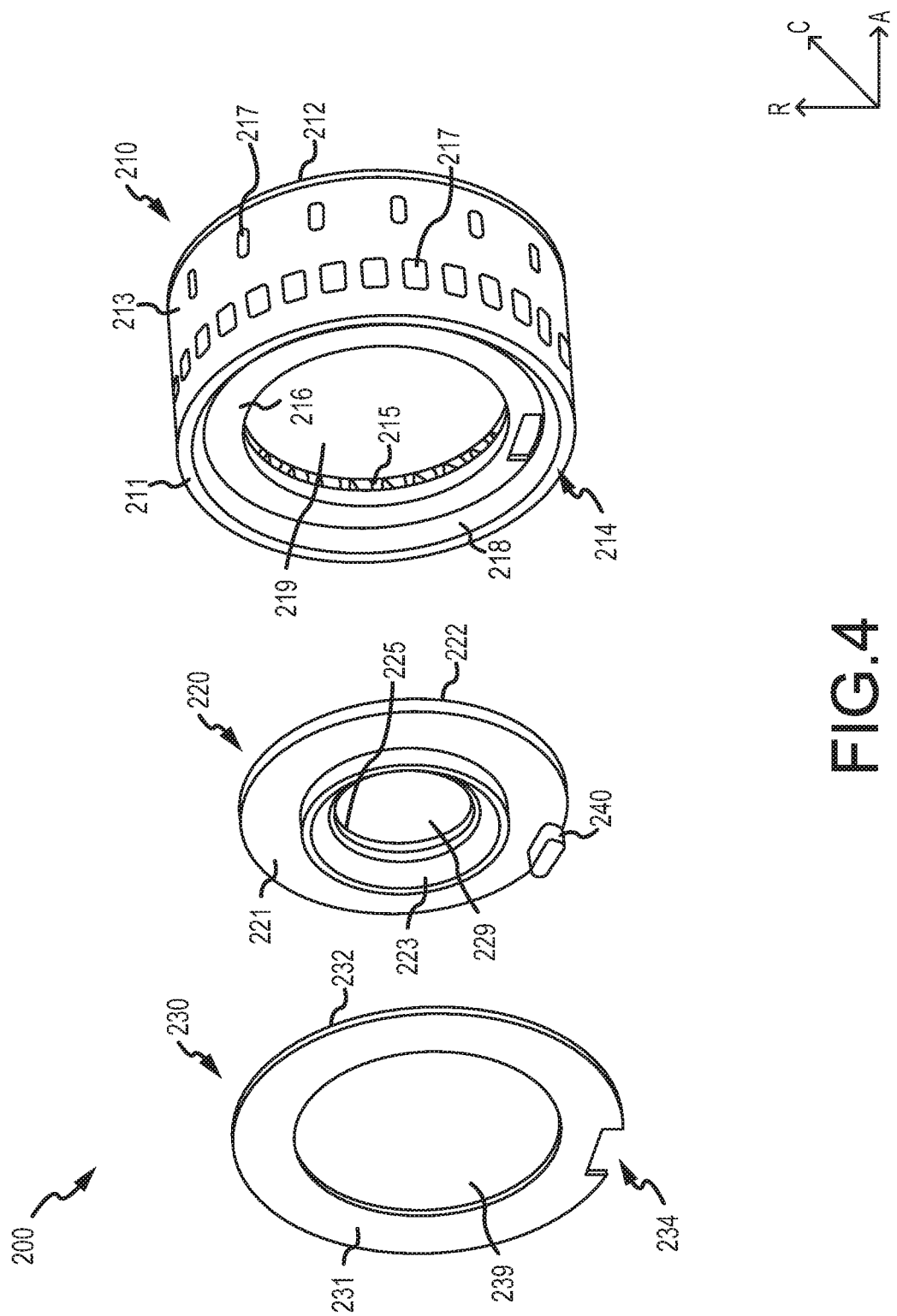
FIG. 4 illustrates a perspective view of a swirler assembly comprising a retaining element on a guide plate, in accordance with various embodiments.

In various embodiments, swirler assembly 100 may comprise any suitable and/or desired number of retaining elements 140 and corresponding recessions (e.g., one or more swirler retaining recessions 114, one or more guide retaining recessions 124, and/or the like). In various embodiments, retaining element 140 may also be located in any suitable location in swirler assembly 100. For example, and with reference to FIG. 4, swirler assembly 200 may comprise a retaining element 240 located on a guide plate 220. Guide plate 220 may be similar to guide plate 120, with brief reference to FIGS. 3A-3C. Guide plate 220 may comprise a forward guide surface 221 axially opposite an aft guide surface 222. Guide plate 220 may also comprise a guide plate opening 229 defining an axial void on forward guide surface 221. Guide plate 220 may comprise a forward sealing protrusion 223 axially opposite an aft sealing protrusion (not depicted). Forward sealing protrusion 223 may be located on forward guide surface 221 and may extend in an axial direction away from forward guide surface 221. Forward sealing protrusion 223 may also define a circumferential boundary along guide plate opening 229. Aft sealing protrusion 225 may be located on aft guide surface 222 and may extend in an axial direction away from aft guide surface 222 of guide plate 220. Aft sealing protrusion 225 may also define a circumferential boundary along guide plate opening 229. Retaining element 240 may be located on forward guide surface 221 and/or aft guide surface 222. Retaining element 240 may extend in an axial direction towards retaining ring 230 and/or towards swirler 210.

In various embodiments, swirler 210 may comprise a corresponding swirler recession 214 configured to interface with and receive retaining element 240. Swirler 210 may be similar to swirler 110, with brief reference to FIGS. 3A-3C. Swirler 210 may comprise a radially outer swirler surface 213 radially opposite a radially inner swirler surface 215. Swirler 110 may comprise one or more swirler inlets 217 defining a radial void on radially outer swirler surface 213. Swirler 210 may comprise a forward swirler surface 211 axially opposite an aft swirler surface 212. Swirler 210 may also comprise a swirler opening 219 defining an axial void on forward swirler surface 211. Swirler 210 may comprise a guide plate recession 216 located on forward swirler surface 211. Guide plate recession 216 may define an axial recession on forward swirler surface 211 circumferentially around swirler opening 219. Forward swirler surface 211 may define an annular wall portion 218 circumferentially surrounding guide plate recession 216. Swirler recession 214 may define an axial void on forward swirler surface 211 proximate radially outer swirler surface 213.

In various embodiments, retaining ring 230 may comprise a corresponding retaining recession 234 configured to interface with and receive retaining element 240. Retaining ring 230 may be similar to retaining ring 130, with brief reference to FIGS. 3A-3C. Retaining ring 230 may comprise a forward retaining surface 231 axially opposite an aft retaining surface 232. Retaining ring 230 may comprise a retaining ring opening 239 defining an axial void on forward retaining surface 231. Retaining recession 234 may define an axial void on forward retaining surface 231 proximate a radially outer surface of retaining ring 230.

Figure 5:
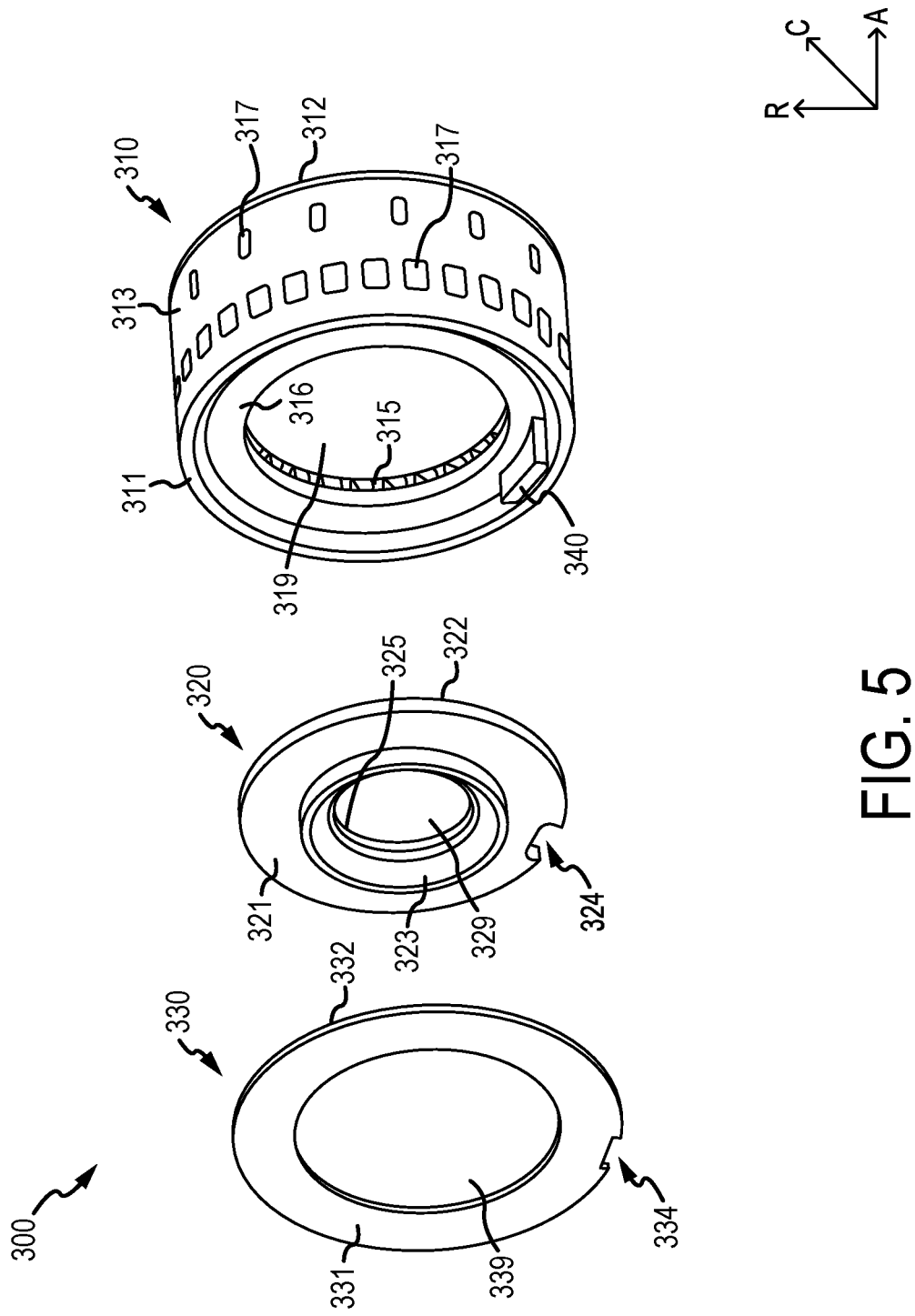
FIG. 5 illustrates a perspective view of a swirler assembly comprising a retaining element on a swirler, in accordance with various embodiments.

As a further example, and in various embodiments with reference to FIG. 5, a swirler assembly 300 may comprise a retaining element 340 located on a swirler 310. Swirler 310 may be similar to swirler 110, with brief reference to FIGS. 3A-3C. Swirler 310 may comprise a radially outer swirler surface 313 radially opposite a radially inner swirler surface 315. Swirler 310 may comprise one or more swirler inlets 317 defining a radial void on radially outer swirler surface 313. Swirler 310 may comprise a forward swirler surface 311 axially opposite an aft swirler surface 312. Swirler 310 may also comprise a swirler opening 319 defining an axial void on forward swirler surface 311. Swirler 310 may comprise a guide plate recession 316 located on forward swirler surface 311. Guide plate recession 316 may define an axial recession on forward swirler surface 311 circumferentially around swirler opening 319. Forward swirler surface 311 may define an annular wall portion 318 circumferentially surrounding guide plate recession 316. Retaining element 340 may be located on forward swirler surface 311 and may extend in an axial direction towards guide plate 220.

Retaining element 340 may be configured to interface with guide retaining recession 324 of guide plate 320. Guide plate 320 may be similar to guide plate 120, with brief reference to FIGS. 3A-3C. Guide plate 320 may comprise a forward guide surface 321 axially opposite an aft guide surface 322. Guide plate 320 may also comprise a guide plate opening 329 defining an axial void on forward guide surface 321. Guide plate 320 may comprise a forward sealing protrusion 323 axially opposite an aft sealing protrusion (not depicted). Forward sealing protrusion 323 may be located on forward guide surface 321 and may extend in an axial direction away from forward guide surface 321. Forward sealing protrusion 323 may also define a circumferential boundary along guide plate opening 329. Aft sealing protrusion 325 may be located on aft guide surface 322 and may extend in an axial direction away from aft guide surface 322 of guide plate 320. Aft sealing protrusion 325 may also define a circumferential boundary along guide plate opening 329. Guide retaining recession 324 may define an axial void on forward guide surface 321 proximate a radially outer surface of guide plate 320.

Retaining element may also be configured to interface with retaining recession 334 of retaining ring 330. Retaining ring 330 may be similar to retaining ring 130, with brief reference to FIGS. 3A-3C. Retaining ring 330 may comprise a forward retaining surface 331 axially opposite an aft retaining surface 332. Retaining ring 330 may comprise a retaining ring opening 339 defining an axial void on forward retaining surface 331. Retaining recession 334 may define an axial void on forward retaining surface 331 proximate a radially outer surface of retaining ring 330.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A swirler assembly defining a longitudinal axis, the swirler assembly comprising:
   a swirler having a forward swirler surface, the forward swirler surface defining a guide plate recession and an annular wall portion circumferentially surrounding the guide plate recession;
   a guide plate coupled within the guide plate recession of the swirler and comprising a first axial void defined axially, with respect to the longitudinal axis, through a portion of the guide plate, the guide plate being circumferentially surrounded by the annular wall portion of the forward swirler surface;
   a retaining ring coupled to the guide plate, the retaining ring comprising a second axial void being defined axially, with respect to the longitudinal axis, into the retaining ring; and
   a retaining element defining an axial protrusion extending forward from the forward swirler surface,
   wherein the axial protrusion is coupled within the first axial void and the second axial void, and
   wherein the retaining element is configured to at least partially resist rotation of the guide plate with respect to the swirler.

2. The swirler assembly of claim 1, wherein at least one of the guide plate, the retaining ring, or the swirler are formed using investment casting.

3. The swirler assembly of claim 1, wherein the axial protrusion of the retaining element comprises an angular shape, a circular shape, or a pin shape.

4. A gas turbine engine comprising:
   a combustor;
   a fuel nozzle configured to deliver fuel into the combustor; and
   a swirler assembly defining a longitudinal axis and coupled around a distal end of the fuel nozzle, the swirler assembly comprising:
      a swirler having a forward swirler surface, the forward swirler surface defining a guide plate recession and an annular wall portion circumferentially surrounding the guide plate recession;

a guide plate coupled within the guide plate recession of the swirler and comprising a first axial void defined axially, with respect to the longitudinal axis, through a portion of the guide plate, the guide plate being circumferentially surrounded by the annular wall portion of the forward swirler surface;

a retaining ring coupled to the guide plate, the retaining ring comprising a second axial void being defined axially, with respect to the longitudinal axis, into the retaining ring; and a retaining element defining an axial protrusion extending forward from the forward swirler surface, wherein the axial protrusion is coupled within the first axial void and the second axial void, and wherein the retaining element is configured to at least partially resist rotation of the guide plate with respect to the swirler.

5. The gas turbine engine of claim 4, wherein at least one of the guide plate, the retaining ring, or the swirler are formed using investment casting.

6. The gas turbine engine of claim 4, wherein the axial protrusion of the retaining element comprises an angular shape, a circular shape, or a pin shape.

7. A swirler assembly, comprising:

a swirler having a forward swirler surface axially opposite an aft swirler surface, wherein the swirler comprises a guide plate recession defining a recess on the forward swirler surface and a retaining element extending in an axial direction from the forward swirler surface;

a guide plate having a forward guide surface axially opposite an aft guide surface, wherein the guide plate is coupled within the guide plate recession of the swirler, and wherein the guide plate comprises a guide retaining recession defining a first void through the forward guide surface; and a retaining ring having a forward retaining surface axially opposite an aft retaining surface and a retaining ring recession defining a second void through the forward retaining surface, wherein the retaining ring is coupled to the guide plate, wherein the retaining element is at least partially inserted into the guide retaining recession and the retaining ring recession to create an interference in the swirler assembly that at least partially resists rotation of the guide plate with respect to the swirler.

8. The swirler assembly of claim 7, wherein at least one of the guide plate, the retaining ring, or the swirler are formed using investment casting.

9. The swirler assembly of claim 7, wherein the guide plate comprises an aft sealing protrusion extending in an axial direction from the aft guide surface, wherein the aft sealing protrusion is configured to provide radial sealing against a radially inner swirler surface of the swirler.

10. The swirler assembly of claim 7, wherein the guide plate comprises a forward sealing protrusion extending in an axial direction from the forward guide surface, wherein the forward sealing protrusion is configured to provide radial sealing against a radially inner surface of the retaining ring.

* * * * *